United States Patent
Engelhardt et al.

(10) Patent No.: US 11,513,327 B2
(45) Date of Patent: Nov. 29, 2022

(54) METHOD OF SCANNING A SAMPLE WITH A LIGHT BEAM FOCUSED BY A MICROSCOPE OBJECTIVE LENS AND SCANNING LIGHT MICROSCOPE

(71) Applicants: Max-Planck-Gesellschaft zur Foerderung der Wissenschaften e.V., Munich (DE); Deutsches Krebsforschungszentrum, Heidelberg (DE)

(72) Inventors: Johann Engelhardt, Bad Schoenborm (DE); Jonas Marquard, Stuttgart (DE)

(73) Assignee: DEUTSCHES KREBSFORSCHUNGSZENTRUM, Heidelberg (DE)

( * ) Notice: Subject to any disclaimer, the term of this patent is extended or adjusted under 35 U.S.C. 154(b) by 276 days.

(21) Appl. No.: 16/896,502

(22) Filed: Jun. 9, 2020

(65) Prior Publication Data

US 2020/0310094 A1 Oct. 1, 2020

Related U.S. Application Data

(63) Continuation of application No. PCT/EP2018/084586, filed on Dec. 12, 2018.

(30) Foreign Application Priority Data

Dec. 15, 2017 (EP) .................................. 17 207 573

(51) Int. Cl.
*G02B 21/00* (2006.01)

(52) U.S. Cl.
CPC ..... *G02B 21/0032* (2013.01); *G02B 21/0048* (2013.01); *G02B 21/0068* (2013.01); *G02B 21/0076* (2013.01)

(58) Field of Classification Search
CPC ................ G02B 21/00; G02B 21/0032; G02B 21/0048; G02B 21/0056; G02B 21/0068;
(Continued)

(56) References Cited

U.S. PATENT DOCUMENTS 5,936,764 A * 8/1999 Kobayashi ............... H04N 3/34
359/368
2011/0249311 A1* 10/2011 Engelhardt ........ G02B 21/0048
359/201.1

FOREIGN PATENT DOCUMENTS

DE 202010004547 U1 11/2011
WO 2010069987 A1 6/2010

OTHER PUBLICATIONS

Jonas Marquard: "Digital Light Deflection and Electro-Optical Laser Scanning for Sted Nanoscopy", Dec. 13, 2017 (Dec. 13, 2017) (Year: 2017).*

(Continued)

*Primary Examiner* — Mustak Choudhury
(74) *Attorney, Agent, or Firm* — Thomas | Horstemeyer, LLP (57) ABSTRACT

Upstream a microscope objective lens, a polarization direction of a light beam is tilted with a first electro-optical deflector between a first polarization direction with which the light beam is deflected by a first polarization beam splitter by a first angle and a second polarization direction with which it is deflected by a second angle. With a second electro-optical deflector, the polarization direction of the light beam is tilted between a third polarization direction with which the light beam is deflected by a second polarization beam splitter by a third angle and a fourth polarization direction with which it is deflected by a fourth angle. By rotating the polarization direction of the light beam by means of the first and second electro-optical deflectors in a (Continued)

coordinated way the light beam is tilted about a fixed point in a pupil of the objective lens.

19 Claims, 4 Drawing Sheets

(58) Field of Classification Search
CPC ............ G02B 21/0072; G02B 21/0076; G02B 21/0036; G02B 26/105; G02F 1/29; H04N 3/10; H04N 3/34
See application file for complete search history.

(56) References Cited

OTHER PUBLICATIONS

Kulcke, W. et al: High-resolution digital light deflector, Applied Physics Letters, vol. 8, pp. 266-268 (1966).
Marquard, J.: "Digital Light Deflection and electro-optical laser scanning for STED nanoscopy", 2017, pages i-69, XP055475734.
Khan, S. et al.: "Demonstration of 3-Dimensional Wide Angle No-Moving Parts Laser Beam Steering", SPIE, 2004, XP040190907.
Maurer, C. et al.: "Tailoring of arbitrary optical vector beams", New Journal of Physics, Institute of Physics Publishing, vol. 9, No. 3, 2007, XP020122657.
Pancharatnam, S.: "Achromatic combinations of birefringent plates", Proceedings of the Indian Academy of Sciences, vol. 41, No. 4, 1955, pp. 130-136, XP009071839.

* cited by examiner

METHOD OF SCANNING A SAMPLE WITH A LIGHT BEAM FOCUSED BY A MICROSCOPE OBJECTIVE LENS AND SCANNING LIGHT MICROSCOPE

CROSS REFERENCE TO RELATED APPLICATIONS

The present application is a continuation to international patent application PCT/EP2018/084586 entitled "Method of Scanning a Sample with a Light Beam focused by a Microscope Objective Lens and Scanning Light Microscope", filed on Dec. 12, 2018, and claiming priority to European patent application EP 17 207 573.1 also entitled "Method of Scanning a Sample with a Light Beam focused by a Microscope Objective Lens and Scanning Light Microscope", and filed on Dec. 15, 2017.

FIELD OF THE INVENTION

The present invention relates to a method of scanning a sample with a light beam focused by a microscope objective lens in scanning light microscopy. More particularly, the present invention relates to such a method comprising the steps of arranging a first electro-optical deflector in a beam path of the light beam upstream the microscope objective lens; deflecting the light beam by means of the first electro-optical deflector in a first spatial direction; arranging a second electro-optical deflector in the beam path of the light beam upstream the microscope objective lens; and deflecting the light beam by means of the second electro-optical deflector. Further, the present invention relates to a scanning light microscope comprising a light source configured to provide a light beam; a microscope objective lens; and a scanner arranged between the light source and the microscope objective lens in a beam path of the light beam and configured to scan a sample with the light beam focused by the microscope objective lens, the scanner including a first electro-optical deflector configured to deflect the light beam in a first spatial direction, and a second electro-optical deflector configured to deflect the light beam.

The present invention belongs to the technical field of scanning light microscopy, particularly to the technical field of super-resolution scanning fluorescence light microscopy including techniques like STED and MinFlux and requiring an accuracy in positioning the light beam in the sample in the order of 1 nm, i.e. of better than 5 nm. The present invention, however, may also be applied to confocal scanning fluorescence light microscopy and other scanning light microscopy techniques.

BACKGROUND OF THE INVENTION

German Utility Model DE 20 2010 004 547 U1 discloses an optical arrangement comprising a light source providing a light beam and optical imaging means through which a sample is scanned with the light beam and through which light generated in the sample by means of the light beam is detected. For scanning the sample with the light beam in a first spatial direction, the light beam is deflected by varying deflection angles by means of an electro-optical deflector operated with a voltage of high frequency. The voltage of high frequency is generated resonantly. For scanning the sample with the light beam in a second spatial direction orthogonal to the first spatial direction, in which the scanning movement is slower than in the first spatial direction, the light beam is deflected by varying deflection angles by a second electro-optical deflector or by a galvanometer mirror.

DE 20 2010 004 547 U1 describes that electro-optical deflectors are very fast but only suitable for small angles of deflection. According to DE 20 2010 004 547 U1, the optical deflectors are used for fast scanning a small scanning range, only.

DE 20 2010 004 547 U1 also describes that it is complicated to control the high operation voltage of an electro-optical deflector precisely such as to direct the light beam to a particular point of interest in the sample.

With regard to the design of the electro-optical deflectors, DE 20 2010 004 547 U1 refers to transparent materials, typically crystals, whose refraction indices can be influenced by electric fields. Due to the fact that the electro-optical deflectors deflect the light beam by varying deflection angles, the electro optical deflectors are analogues electro-optical deflectors in which the defection angles are essentially proportional to the voltage applied.

Digital electro-optical deflectors and a combined use of different digital electro-optical deflectors providing for different angle differences in a same spatial direction are generally known from other technical fields than scanning light microscopy. For example, W. Kulcke et al.: High-resolution digital light deflector, Appl. Phys. Lett. 8, 266 (1966) disclose a 16-stage converging beam digital electro-optical light deflector capable of positioning a laser beam to any one of 65,536 resolvable positions in a two-dimensional array. This 16-stage electro-optical light deflector is to based on split-angle digital electro-optical deflectors utilizing a combination of two effects. Displacement or deflection of the light beam is based on the splitting of the ordinary and extraordinary rays in birefringent crystals such as calcite. Switching the beam from one polarization to the other is accomplished by using the electro-optical Pockels effect in KD*P crystals. One stage of the deflector consists of a calcite crystal and a KD*P crystal. A n-stage deflector offers the capability of positioning a light beam to any one of $2^n$ positions. By sending a converging beam through a properly designed device and focusing on an output focal plane, a higher resolution can be obtained as compared to a collimated beam. In using the convergent beam, maximum use is made of the deflector aperture, and the number of deflection positions is increased for a given crystal size. To have all the output positions focused on the same plane, the optical path length in the deflector should be equal for all positions.

S. A. Khan et al.: "Demonstration of 3-Dimensional Wide Angle No-Moving Parts Laser Beam Steering", Proc. of SPIE Vol. 5550, pages 47 to 59, disclose a liquid crystal-based scanner for steering a laser beam in three dimensions. The scanner consists of a combination of digital and analog control polarization-based beamforming optics resulting in both continuous and random fashion beam steering. Key elements of the disclosed scanner are polarization control elements and polarization dependent beam steering elements. For polarization control, fast response digital controlled 90° polarization switches are used. For angular scanning, birefringent material prisms are used to steer the beam into a desired spot. Using N polarization switch-prism pairs, $2^N$ scan spots can be obtained. For coarse angular scanning, passive birefringent crystal prisms are used. Multiple coarse stages are cascaded to achieve a large angular dynamic range with discrete scan spots. To fill the uncovered spaces between these discrete scan spots, analog-mode electrically controlled nematic liquid crystal prisms are incorporated into the scanner design. The disclosed scanner is proposed for such applications as free-space optical wireless, inter-satellite links, optical microscopy, mobile military platforms, and 3-D displays.

J. Marquard: "Digital Light Deflection and Electro-Optical Laser Scanning for STED Nanoscopy", dissertation, Heidelberg, was published on the internet under http://archiv.ub.uni-heidelberg.de/volltextserver/23956/1/dissJonasMarquard_Abgabe.pdf on Jan. 12, 2018 was the subject of a thesis defense on Dec. 13, 2017. The dissertation discloses a scanner based on electro-optical deflectors each composed of a Pockels-cell and a Wollaston prism. N stages of this kind yield a field of enlargement by a factor of $2^N$. The dissertation does also explain how digital light deflectors may be achromatized applying the principals previously reported by Pancharatnam (see below) for polarizers and wave plates. This achromatization, however, was not subject of the thesis defense on Dec. 13, 2017.

WO 2010/069987 A1 discloses a scanner in which a light beam is deflected in two different directions. In each direction the light beam is successively deflected by two rotating mirrors about two deflection angles which are dynamically changed independent of one another. This known scanner is particularly used to tilt the light beam in the two directions about a fixed point of a pupil of an objective focusing the light beam to scan a two dimensional scanning area of a sample without variation of the scanning conditions over the scanning area.

There still is a need of a method of scanning a sample with a light beam focused by a microscope objective lens in scanning light microscopy and a scanning light microscope which make better use of electro-optical deflectors in scanning the sample with the light beam at high speed and high precision over an enlarged scanning range.

SUMMARY OF THE INVENTION

The present invention relates to a method of scanning a sample with a light beam focused by a microscope objective lens in scanning light microscopy. The method comprises arranging a first electro-optical deflector in a beam path of the light beam upstream the microscope objective lens; rotating a polarization direction of the light beam by means of the first electro-optical deflector between a first polarization direction with which the light beam is deflected by a first polarization beam splitter of the first electro-optical deflector by a first angle in the first spatial direction and a second polarization direction with which the light beam is deflected by the first polarization beam splitter by a second angle in the first spatial direction; arranging a second electro-optical deflector in the beam path of the light beam upstream the microscope objective lens; and rotating the polarization direction of the light beam by means of the second electro-optical deflector between a third polarization direction with which the light beam is deflected by a second polarization beam splitter of the second electro-optical deflector by a third angle in the first spatial direction and a fourth polarization direction with which the light beam is deflected by the second polarization beam splitter by a fourth angle in the first spatial direction. A second angle difference between the third and the fourth angles in the first spatial direction is at least 1.5-times a first angle difference between the first and the second angles in the first spatial direction; and arranging the first and second electro-optical deflectors in the beam path of the light beam and rotating the polarization direction of the light beam by means of the first and second electro-optical deflectors are coordinated such that the light beam is tilted about a fixed point in a pupil of the microscope objective lens in the first spatial direction.

The present invention also relates to a scanning light microscope comprising a light source configured to provide a light beam; a microscope objective lens; and a scanner arranged between the light source and the microscope objective lens in a beam path of the light beam and configured to scan a sample with the light beam focused by the microscope objective lens. The scanner includes a first electro-optical deflector configured to deflect the light beam in a first spatial direction, and a second electro-optical deflector configured to deflect the light beam. The first electro-optical deflector is a first digital electro-optical deflector configured to deflect the light beam either by a first angle in the first spatial direction or by a second angle in the first spatial direction. The first electro-optical deflector comprises a first polarization rotating device configured to rotate a polarization direction of the light beam between a first polarization direction and a second polarization direction, and a first polarization beam splitter configured to deflect the light beam with the first polarization direction by the first angle in the first spatial direction and the light beam with the second polarization direction by the second angle in the first spatial direction. The second electro-optical deflector is a second digital electro-optical deflector configured to deflect the light beam either by a third angle in the first spatial direction or by a fourth angle in the first spatial direction. The second electro-optical deflector comprises a second polarization rotating device configured to rotate a polarization direction of the light beam between a third polarization direction and a fourth polarization direction, and a second polarization beam splitter configured to deflect the light beam with the third polarization direction by the third angle in the first spatial direction and the light beam with the fourth polarization direction by the fourth angle in the first spatial direction. A second angle difference between the third and the fourth angles in the first spatial direction is at least 1.5-times a first angle difference between the first and the second angles in the first spatial direction; and the first and second electro-optical deflectors of the scanner are configured to tilt the light beam about a fixed point in a pupil of the microscope objective lens in the first spatial direction.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

According to the present disclosure, a method of scanning a sample with a light beam focused by a microscope objective lens in scanning light microscopy comprises the steps of arranging a first electro-optical deflector in the beam path of the light beam upstream the microscope objective lens; deflecting the light beam by means of the first electro-optical deflector in a first spatial direction; arranging a second electro-optical deflector in the beam path of the light beam upstream the microscope objective lens; and deflecting the light beam by means of the second electro-optical deflector also in the first spatial direction. Deflecting the light beam by means of the first electro-optical deflector in the first spatial direction includes rotating a polarization direction of the light beam by means of the first electro-optical deflector between a first polarization direction with which the light beam is deflected by a first polarization beam splitter of the first electro-optical deflector by a first angle in the first spatial direction and a second polarization direction with which the light beam is deflected by the first polarization beam splitter by a second angle in the first spatial direction. Similarly, deflecting the light beams by means of the second electro-optical deflector includes rotating the polarization direction of the light beam by means of the second electro-optical deflector between a third polarization direction with which the light beam is deflected by a second polarization beam splitter of the second electro-optical deflector by a third angle in the first spatial direction and a fourth polarization direction with which the light beam id deflected by the second polarization beam splitter by a fourth angle in the first spatial direction. These steps require that each of the first and second electro-optical deflectors comprises both an polarization rotating device for rotating the polarization direction of the light beam and the first or second polarization beam splitter deflecting the light beam depending on its polarization direction, by different deflection angles in the first spatial direction. Here, one of the first and second angles and/or one of the third and fourth angles by which the light beam, depending on its polarization direction, is deflected in the first spatial direction may be an angle of zero.

Due to the facts that the deflections by the first and the second electro-optical deflectors are added up in the first spatial direction, and that a second angle difference between the third and the fourth angles in the first spatial direction is at least 1.5-times a first angle difference between the first and the second angles in the first spatial direction, it is possible to deflect the light beam by means of the first and second electro-optical deflectors by a total of four different overall deflection angles corresponding to four different scanning points in the sample in the first spatial direction. According to the method of the present disclosure, the light beam is digitally steered into the selected one of these four scanning points depending on the polarization directions adjusted by the electro-optical deflectors to which the polarization beams splitters will respond by either deflecting the light beam by one of two defined first and second angles and one of the defined third and fourth angles in the first spatial direction, respectively.

The term "polarization beam splitter" is to be interpreted in the most broad way here. In fact, it does not require more than that the polarization beam splitter is configured to deflect the light beam depending on its polarization direction by either the first or second or either the third or fourth angle, respectively.

In a scanning light microscope according to the present disclosure comprising a light source configured to provide a light beam; a microscope objective lens; and a scanner arranged between the light source and the microscope objective lens in a beam path of the light beam and configured to scan a sample with the light beam focused by the microscope objective lens, the scanner including a first electro-optical deflector configured to deflect the light beam in a first spatial direction, and a second electro-optical deflector also configured to deflect the light beam in the first spatial direction, the first and second electro-optical deflectors are first and second digital electro-optical deflectors configured to deflect the light beam by either a first or a second angle and either a third or fourth angle in the first spatial direction, respectively; and a second angle difference between the first and the fourth angles in the first spatial direction is at least 1.5-times a first angle difference between the first and the second angles in the first spatial direction.

Particularly, the scanner of the scanning light microscope according to the present disclosure may include a voltage source configured to provide a first and a second voltage, and each of the first and the second electro-optical deflectors may comprise a first or second polarization rotating device and a first or second polarization beam splitter, respectively. The respective polarization rotating device is configured to rotate a polarization direction of the light beam between a first or third polarization direction or a second or fourth polarization direction, respectively, by application of the first or second voltage, and the respective polarization beam splitter is configured to deflect the light beam with the first or third polarization direction by the first or third angle in the first spatial direction and the light beam with the second or fourth polarization direction by the second or fourth angle in the first spatial direction, respectively.

Both in the method and in the scanning light microscope according to the present disclosure, the first and second polarization directions may be the same as the third and fourth or fourth and third polarization directions.

The method and the scanning light microscope according to the present disclosure may, in principle, use the same multistage digital electro-optical light deflector as known from W. Kulcke et al. and other prior art documents published with regard to digital light deflectors in the sixties and seventies of the 20th century. However, care has to be taken of adapting the known digital optical light deflectors to the constraints in scanning light microscopy and particularly in ultra-resolution scanning fluorescence light microscopy.

If, for example in STED or MinFlux microscopy, a light intensity distribution of the focused light beam is desired which comprises a central intensity minimum surrounded by intensity maxima, the deflected light beam, whose wave fronts have been deformed to achieve the desired light intensity distribution, should always pass to a same point of a pupil of the microscope objective lens. Particularly, the light beam should be tilted about a center of the pupil of the microscope objective lens. Thus, in the method of the present disclosure, arranging the first and second electro-optical deflectors in the beam path of the light beam and rotating the polarization direction of the light beam by means of the first and second electro-optical deflectors are conducted such that the light beam is tilted about a fixed point in a pupil of the microscope objective lens in the first spatial direction. In the scanning light microscope of the present disclosure, the first and second electro-optical deflectors of the scanner are configured to tilt the light beam about a fixed point in a pupil of the microscope objective lens in the first spatial direction. For example, the first electro-optical deflector may deflect the light beam by either a first deflection angle of $\alpha$ or a second deflection angle of $-\alpha$ in the first spatial direction, and the second electro-optical deflector may then deflect the light beam either by a third deflection angle of $-2\alpha$ or $2\alpha$ in the first spatial direction. If then the first and third deflection angles or the second and fourth deflection angles are combined and if the distances of the first and second electro-optical deflectors to the pupil of the microscope objective lens are suitably adjusted, the light beam is tilted about the center of the pupil between two overall deflection angles of $-\alpha$ and $\alpha$. In this embodiment of the present disclosure, the first and second optical deflectors are used to direct the light beam to two different scanning points in the sample. With a higher number of optical deflectors for deflecting the light beam in the first spatial direction, however, less than twice the number of stages are needed than compared to the digital optical deflector known from Kulcke et al. to achieve the same number of different scanning points in the sample.

Generally, with special electro-optical deflectors deflecting the light beam by the respective deflection angles in that the light beam is tilted about a rotating point downstream the polarization beam splitter of the electro-optical deflector, the arrangement of the electro-optical deflectors may fulfil the criterion of rotating the light beam about a fixed point in a pupil of the microscope objective lens in the first spatial direction without using any additional electro-optical deflectors. Alternatively or additionally, it is possible to arrange different ones of the first and second electro-optical deflectors with regard to different images of the pupil of the microscope objective lens to keep the above criterion. This, however, may considerably lengthen the overall optical path of the scanning light microscope.

Further, the digital electro-optical deflector according to Kulcke et al. displays chromatic properties which are unwanted in scanning light microscopy because the light beam may comprise components of different wavelengths as it may be of interest to have light beams of different wavelengths and/or as the scanner should also be suitable for descanning light generated by the light beam in the sample which typically also has a wavelength different to the wavelength of the light beam. To make the digital optical deflector generally known from Kulcke et al. achromatic, each polarization rotating device may comprise at least two polarization rotating elements which are arranged according to Pancharatnam such as to provide for achromatically rotating the respective polarization direction of the light beam. Further, each of the polarization beam splitters may be an achromatic polarization beam splitter.

The arrangement of polarization rotating elements according to Pancharatnam means the arrangement known from S. Pancharatnam: "Achromatic combinations of birefringent plates", Part I. An achromatic circular polarizer, Proc. Indian Acad. Sci. 41a (1955), 130-136. In this arrangement, a plurality of equal chromatic birefringent elements arranged at selected angles between their fast axes provides for an achromatic waveplate. This concept is transferable to polarization rotating elements of electro-optical deflectors.

Here, the at least two polarization rotating elements should be equal with regard to their polarization rotating properties, and they may be completely identical or not. Polarization beam splitters may have sufficient achromatic properties by nature, like for example a polarization beam splitter cube. Other polarization beam splitters may be made achromatic by using suitable known material combinations. Generally, the required achromasia will be present over a wavelength range extending over $\pm 10\%$ of a center wavelength. The present disclosure may also be implemented such as to provide for achromasia over a wavelength range extending over $\pm 20\%$ of the center wavelength or even $\pm 30\%$ of the center wavelength.

Further, due to the birefringent nature of the polarization beam splitters of the digital electro-optical deflector known from Kulcke et al., it is as such not suitable for descanning the entire light generated by the light beam in the sample as this light may have any polarization direction. However, the method and in the scanning light microscope of the present disclosure may allow for descanning the entire light from the sample independently of its polarization direction in that an additional polarization beam splitter and a passive polarization rotating element are arranged between the microscope objective lens and all the optical deflectors. The additional polarization beam splitter splits up light emitted out of the sample and passing through the microscope objective lens in two components of two orthogonal polarization directions. The passive polarization rotating element rotates the one of the two orthogonal polarization directions of the one component in the other of the two polarization directions of the other component. Then, both components of the fluorescence light are descanned by all the optical deflectors arranged downstream the passive polarization rotating elements in the beam path of the light emitted out of the sample. This additional arrangement is completely passive. It may be configured to combine the two components of the light from the sample before its detection. Alternatively, the two components of the light emitted out of the sample differing in original polarization direction may be kept separate and detected separately.

As already indicated above, particularly via the reference to Kulcke et al., at least a third electro-optical deflector may be arranged in the beam path of the light beam upstream die microscope objective lens, and the polarization direction of the light beam may be tilted by means of the third electro-optical deflector between a fifth polarization direction with which the light beam is deflected by a third polarization beam splitter of the third electro-optical deflector by a fifth angle in the first spatial direction and a sixth polarization direction with which the light beam is deflected by the third polarization beam splitter by a sixth angle in the first spatial direction. Here, a third angle difference between the fifth and the sixth angles in the first spatial direction may be at least 1.5-times the second angle difference between the third and the fourth angles in the first spatial direction. Further such digital electro-optical deflectors may by arranged to implement further stages of the scanner, each further stage adding further scanning points in the sample to which the light beam may be directed. In an ideal case, each further stage doubles the number of possible scanning points.

Further, an additional analogue acousto- or electro-optical deflector may be arranged in the beam path of the light beam upstream of the microscope objective lens to deflect the light beam by a variable angle in the first spatial direction. If an angle range covered by the variable angle in the first spatial direction is about equal to the first angle difference between the first and the second angles in the first spatial direction, the focused light beam may be directed to any point of the sample in the first spatial scanning direction. This analogue optical deflector is only provided to cover the smallest angle range of all optical deflectors so that the limited angle range of known analogues acousto- or electro-optical deflectors is no problem. The analogue deflector may additionally be used to correct or compensate for residual deflection angle errors caused by manufacturing inaccuracies, temperature effects, chromatic deviations or such.

To also scan the respective sample in a second spatial direction orthogonal to the first spatial direction, at least a fourth electro-optical deflector and a fifth electro-optical deflector may be arranged and operated in a similar way as the first and second electro-optical deflectors. These fourth and fifth electro-optical deflectors may also be supplemented by at least one additional digital or analogue optical deflector corresponding to the third electro-optical deflector or the analogue acousto- or electro-optical deflector described above.

Particularly, each of the polarization rotating devices or of the polarization rotating elements, if the polarization rotating devices comprise two or more polarization rotating elements, may independently be selected from Kerr-cells and Pockels-cells. Kerr-cells and Pockels-cells are well known means for electro-optically rotating a linear polarization direction of an incoming light beam in another linear polarization direction as required by the polarization rotating devices of the digital electro-optical deflectors to be used in the present disclosure. In principle liquid crystals could also serve as polarization rotators. But they are notoriously slow and more lossy as compared to crystals typically used in Pockels-cells.

Each of the polarization beams splitters may generally by selected from any known polarization beam splitters including polarization beams splitter cubes. Particularly, however, each of the polarization beam splitters is independently selected from Wollaston- and Nomarski-prisms. Wollaston-prisms will provide for a particular compact setup, and Nomarski-prisms will allow for a series of a multitude of optical deflectors upstream the microscope objective lens all rotating the light beam about a same fixed point in the pupil of the microscope objective lens.

Due to the fact that, in the method and the scanning light microscope according to the present disclosure, the scanning points in the sample to which the light beam is directed are addressed digitally, the sequence of the scanning points may easily be a random sequence or a non-random sequence in which an average distance between consecutive scanning points is maximized. This allows for a maximum relaxation of the sample in the surroundings of the last scanning point before the light beam is directed to the next scanning point within the surroundings. In this way, the yield of photons from a fluorophore in the sample may be maximized even if high light intensities in the surroundings of the actual scanning point tend to transfer the fluorophore into a comparatively long living dark state. The danger of photochemically bleaching the fluorophore will also be reduced in this way. Further, the sequence of the switching points may also be defined in such a way that the frequencies at which the individual digital electro-optical deflectors have to be operated are minimized. Such switching schemes are generally known as reflected binary code or Gray code.

Figure 1:
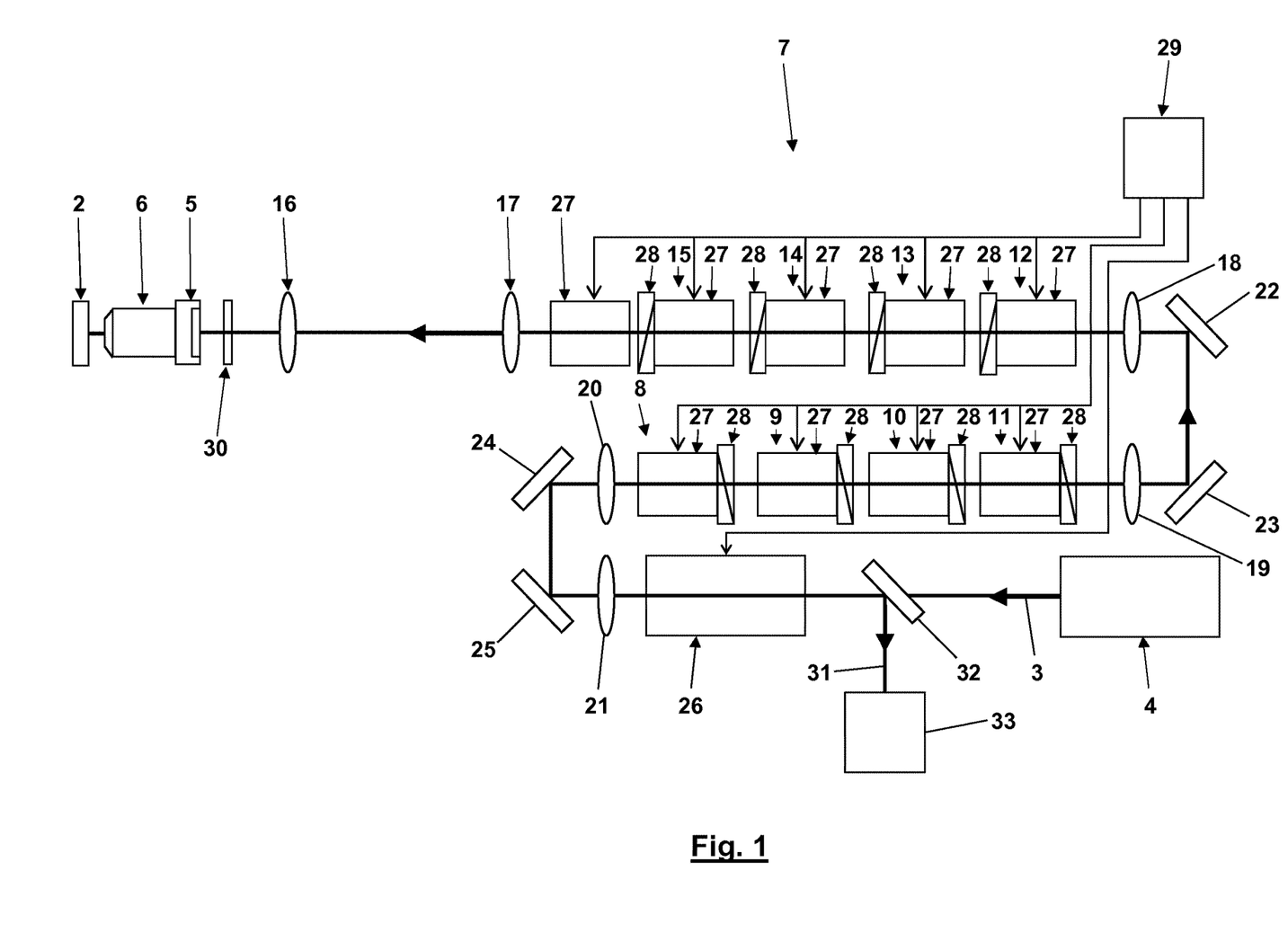
FIG. 1 shows a scanning light microscope according to the present disclosure.

Now referring in greater detail to the drawings, the scanning light microscope 1 according to FIG. 1 is a STED microscope in which a sample 2 is scanned with a light beam 3 comprising both excitation light and stimulation light. The light beam 3 is provided by a light source 4. A so-called easySTED waveplate 5 which is arranged in a pupil of a microscope objective lens 6 selectively deforms the wave fronts of the stimulation light such that an intensity distribution of the stimulation light in the sample 2 displays a zero point surrounded by intensity maxima at the focal spot of the excitation light. An area of interest of the sample 2 is scanned with these superimposed intensity distributions of the excitation light and the stimulation light by means of a scanner 7. The scanner 7 deflects the light beam 3 such as to direct it to particular scanning points in the sample 2. The scanning points are arranged in a two-dimensional array extending in x-direction and y-direction, i.e. in two orthogonal spatial directions. Both the x-direction and the y-direction are orthogonal to the z-direction of the optical axis of the microscope objective lens 6. A third spatial direction, i.e. the axial direction, may additionally be addressed here in ways known from confocal microscopy, for example. The sample or an optical element may be moved axially to address the third dimension. Alternatively or additionally lenses having a variable focus length or acoustic lenses or the like may be employed.

For scanning the sample in x-direction, the scanner 7, in the present example, comprises a series of four digital electro-optical deflectors 8 to 11, and for scanning the sample 2 in y-direction, the scanner 7 comprises a further series of four digital electro-optical deflectors 12 to 15. Each of the series of the digital electro-optical deflectors 8 to 11 and 12 to 15, respectively, is arranged around an image of the pupil of the microscope objective lens 6. This is achieved by an optical system comprising lenses 16 to 21 and mirrors 22 to 25. The optical system also ensures that a further analogue two-dimensional electro-optical deflector 26 is arranged in the area of an image of the pupil of the microscope objective lens 6. Each of the series of digital electro-optical deflectors 8 to 11 and 12 to 15 comprises four digital electro-optical deflectors with increasing angle differences between the two deflection angles by which each of the digital optical deflectors may deflect the light beam 3. Particularly, the angle difference may double from digital electro-optical deflector to digital electro-optical deflector within each of the series. For example, the angle differences of the digital electro-optical deflectors 8 and 12 may be 2 mrad, the angle differences of the digital electro-optical deflectors 9 and 13 may be 4 mrad, the angle differences of the digital electro-optical deflectors 10 and 14 may be 8 mrad, and the angle differences of the digital electro-optical deflectors 11 and 15 may be 16 mrad. By means of each of the series of digital electro-optical deflectors 8 and 11, the light beam may thus be directed to $2^4$ different scanning points both in x-direction and y-direction, i.e. to a total of $2^8$ different scanning points in the sample 2. By means of the additional analogue electro-optical deflector 26 which allows for additionally deflecting the light beam 3 by ±3.0 mrad in both x- and y-direction, it is also possible to purposefully direct the light beam 3 to any intermediate point between these $2^8$ scanning points. Each of the digital electro-optical deflectors 8 to 15 consists of a polarization rotating device 27 and a polarization beam splitter 28. The polarization rotating device 27 rotates the incoming light beam 3 such that the downstream polarization beam splitter 28 either deflects the light beam by one or by another deflection angle separated by the respective angle difference already mentioned. With the series of digital electro-optical deflectors 8 to 11 and 12 to 15 this means that the downstream polarization rotating devices have to be operated depending on the operation of the upstream polarization rotating devices as the upstream polarization rotating devices define the polarization direction of the light beam 3 getting to the downstream polarization rotating elements. Typically, the polarization rotating devices 27 are Kerr-cells or Pockels-cells operated by applying voltages provided by a voltage source 29. A λ/4 waveplate 30 arranged downstream the scanner 7 is provided to circularly polarize the light beam 3 prior to being focused in the sample 2. To ensure proper function of the λ/4 waveplate 30, an additional polarization rotating device 27 may be arranged between the scanner 7 and the λ/4 waveplate 30. The additional polarization rotating device 27 not belonging to one of the digital electro-optical deflectors 8 to 11 or 12 to 15 is operated such that the light beam 3 getting out of the scanner 7 always has the same linear polarization direction.

Light 31 emitted out of the sample is descanned by the scanner 7 and separated from the light beam 3 by means of a dichroitic mirror 32. The dichroitic mirror 32 deflects the light 31 towards a detector 33. By means of the scanner 7, the light beam 3 can very quickly be switched between different scanning points in the sample 2. However, with descanning the light 31 emitted out of the sample 2, one should wait for detecting this light 31 generated by a pulse of the light beam 3, for example, before switching to the next scanning point. This next scanning point may be a scanning point neighboring the last scanning point. However, it may be preferred to switch between scanning points which are not directly neighboring each other as already explained above. Further, the sequence of the switching points may also be defined in such a way that the frequencies at which the individual digital electro-optical deflectors 8 to 11 and 12 to 15 are operated are minimized. Such switching schemes are generally known as reflected binary code or Gray code or the like.

Figure 2:
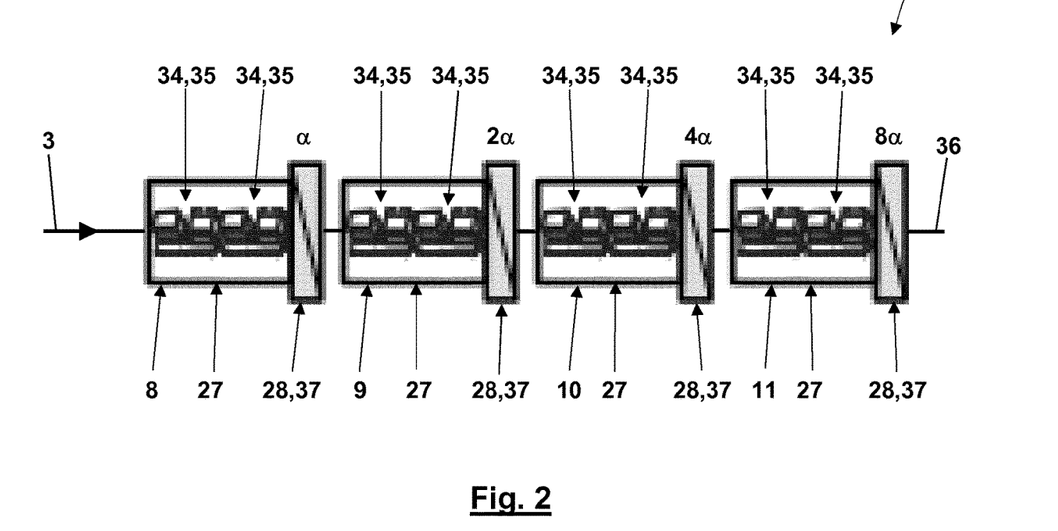
FIG. 2 depicts a series of achromatic digital electro-optical deflectors of the scanning light microscope according to FIG. 1.

FIG. 2 shows one of the series of digital electro-optical deflectors 8 to 11 of FIG. 1 in more detail. Each of the polarization rotating devices 27 consists of two polarization rotating elements 34 made as Pockels-cells 35. The two Pockels-cells are arranged at rotation angles about their common optical axis 36 according to the principles of Pancharatnam to provide the polarization rotating device 27 with achromatic properties. For example, the two Pockels-cells, with their directions of the electric flied applied, are arranged at rotation angles of 24° and 66° with regard to the x-direction in which the polarization beam splitter 28 deflects the incoming light beam 3. The polarization beam splitters 28 are achromatic Wollaston-prisms 37. Thus, the entire series of digital electro-optical deflectors 8 to 11 and the entire scanner 7 according to FIG. 1 is achromatic. This applies both with regard to the light beam 3 comprising excitation light and stimulation light of different wavelengths and to the light 31 from the sample 2 descanned by the scanner 7.

Figure 3:
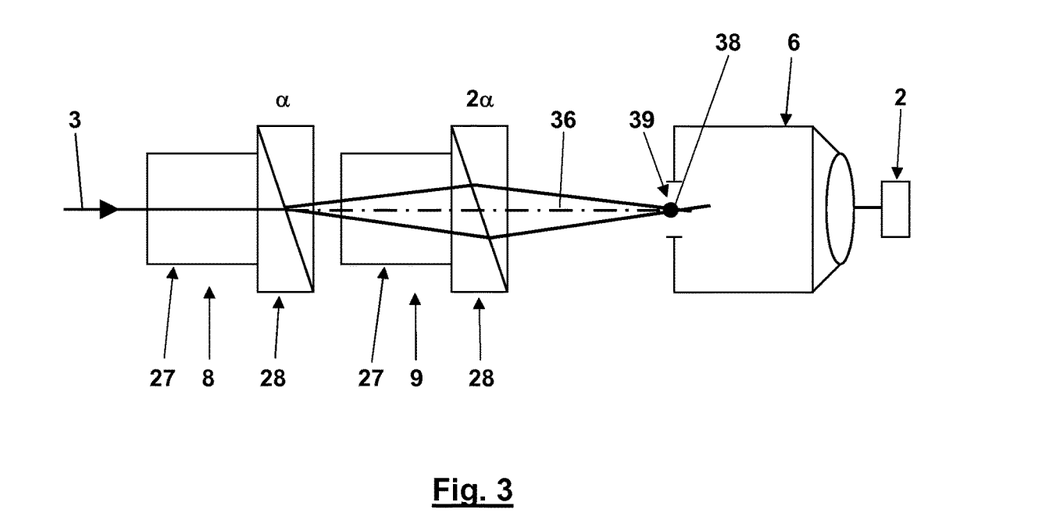
FIG. 3 illustrates rotating a light beam about a center point of a pupil of a microscope objective lens with two digital electro-optical deflectors.

FIG. 3 illustrates how a series of two digital electro-optical deflectors 9 and 10 can be used for rotating the deflected light beam 3 about a fixed point 38 which may be a center point of the pupil 39 of the microscope objective lens 6 or an image thereof. Alternatively, the fixed point 38 may be closely spatially related to this center point of the pupil 39 or to an image thereof. The first digital electro-optical deflector 9 deflects the incoming light beam 3 by a deflection angle of +α/2 or −α/2, and the second digital electro-optical deflector 10 deflects the light beam 3 in the same spatial direction but with opposite sign by a deflection angle of −α or +α so that the light beam 3 always gets back to the optical axis 36 and intercedes the optical axis 36 at the fixed point 38. This concept can also be implemented with an increased number of digital electro-optical deflectors. With more than two digital electro-optical deflectors this concept does not necessarily reduce the number of different scanning points to a half in each spatial direction, i.e. to $2^n/2$, n being the number of digital electro-optical deflectors 8 to 11 or 11 to 15 of the series of digital electro-optical deflectors for the respective spatial direction. The light beam 3 always passing the pupil 39 in the fixed point 38 ensures that the light intensity distribution of the light beam does not change from scanning point to scanning point but remains constant. This is particularly important with regard to the light intensity distribution of the stimulation light whose wavefronts are deformed by the easySTED waveplate 5 according to FIG. 1.

Figure 4:
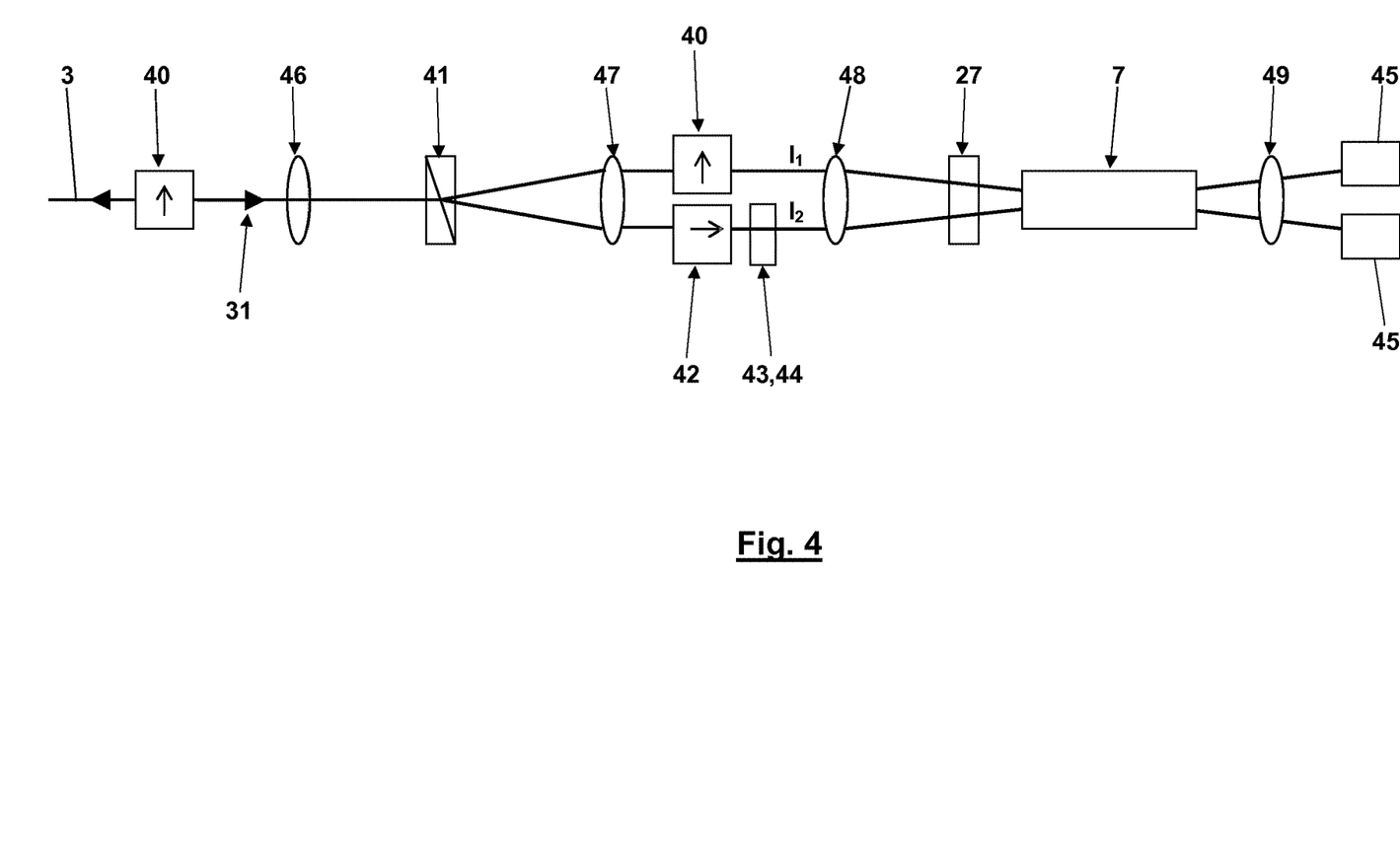
FIG. 4 shows how to descan light of all polarization directions emitted out of a sample in an enhanced embodiment of the scanning light microscope according to the present disclosure.

FIG. 4 illustrates how it is possible to descan and detect the light 31 emitted out of the sample independently on its polarization direction. Without any measures being taken, the scanner 7 is only able to descan that component $I_1$ of the light 31 which has the same polarization direction 40 as the light beam 3 downstream the additional polarization rotating device 27 used for polarization restoration. According to FIG. 4, an additional polarization beam splitter 41 is used for splitting up the light 31 into the component $I_1$ with the polarization direction 40 and in a component $I_2$ with an orthogonal polarization direction 42. This second component $I_2$ is separately passed through a passive polarization rotating element 43, i.e. a λ/2 waveplate 44, so that both components $I_1$, and $I_2$ have the same polarization direction 40 downstream of the λ/2 waveplate 44 and may thus be descanned by the scanner 7. Nevertheless, the two components $I_1$ and $I_2$ display an offset introduced by the polarization beam splitter 41. This offset may be used to separately detect the components $I_1$ and $I_2$ with separate partial detectors 45. Alternatively, the beam paths of the two components $I_1$ and $I_2$ could be recombined and the two components $I_1$ and $I_2$ could then detected by means of one common detector 33 according to FIG. 1. The optical system according to FIG. 4 additionally includes lenses 46 to 49.

Figure 5:
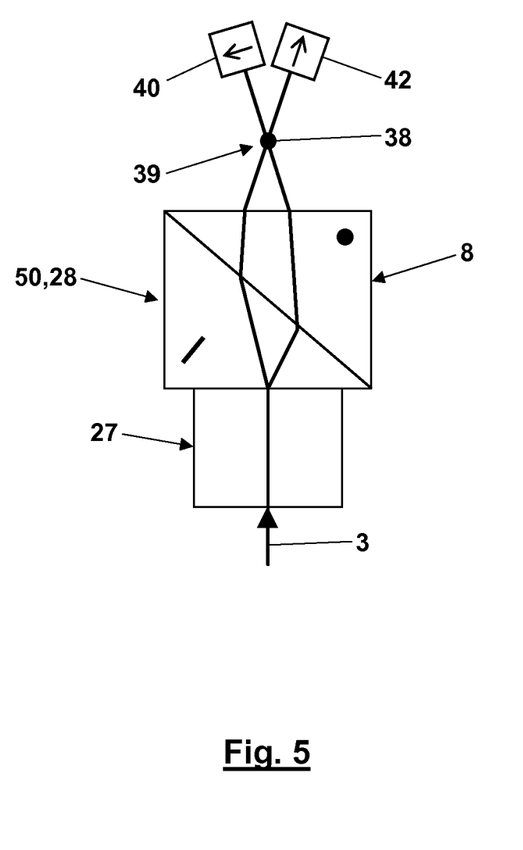
FIG. 5 shows a Nomarski-prism and point of intersection of two differently polarized components of an incoming light beam, the point of intersection being located downstream the Nomarski-prism.

FIG. 5 shows a Nomarski-prism 50 deflecting the incoming light beam 3 depending on its polarization direction 40 or 42. The polarization direction 40 or 42 is defined by an upstream polarization rotating device 27. The light beam 3 deflected by the Nomarski-prism 50 always passes through the same fixed point 38 located downstream the Nomarski-prism 50. Thus, with using a Nomarski-prism 50 as the polarization beam splitter 28, the light beam 3 can be tilted about the fixed point 38 in the pupil 39 of the microscope objective lens 6 or an image thereof without the need of two consecutive digital electro-optical deflectors deflecting the light beam by deflection angles of opposite signs in the same spatial direction.

It is even possible to arrange some digital electro-optical deflectors 9 to 15 comprising different Nomarski-prisms 50 with different distances of the fixed point 38 to the respective Nomarski-prisms 50 in such a series that all the digital electro-optical deflectors rotate the light beam 3 about the same fixed point 38 in the pupil 39.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of scanning a sample with a light beam focused by a microscope objective lens in scanning light microscopy, the method comprising arranging a first electro-optical deflector in a beam path of the light beam upstream the microscope objective lens;
rotating a polarization direction of the light beam by means of the first electro-optical deflector between a first polarization direction with which the light beam is deflected by a first polarization beam splitter of the first electro-optical deflector by a first angle in the first spatial direction and a second polarization direction with which the light beam is deflected by the first polarization beam splitter by a second angle in the first spatial direction;
arranging a second electro-optical deflector in the beam path of the light beam upstream the microscope objective lens; and
rotating the polarization direction of the light beam by means of the second electro-optical deflector between a third polarization direction with which the light beam is deflected by a second polarization beam splitter of the second electro-optical deflector by a third angle in the first spatial direction and a fourth polarization direction with which the light beam is deflected by the second polarization beam splitter by a fourth angle in the first spatial direction;
wherein a second angle difference between the third and the fourth angles in the first spatial direction is at least 1.5-times a first angle difference between the first and the second angles in the first spatial direction, and
wherein arranging the first and second electro-optical deflectors in the beam path of the light beam and rotating the polarization direction of the light beam by means of the first and second electro-optical deflectors are coordinated such that the light beam is tilted about a fixed point in a pupil of the microscope objective lens in the first spatial direction.

2. The method of claim 1, wherein rotating the polarization direction of the light beam by means of each of the respective first and second electro-optical deflectors includes rotating the polarization direction of the light beam by means of at least two polarization rotating elements which are arranged such as to provide for achromatically rotating the respective polarization direction of the light beam, wherein each of the polarization beam splitters is an achromatic polarization beam splitter.

3. The method of claim 2, wherein the at least two polarization rotating elements are equal, and wherein the at least two polarization rotating elements are arranged at different rotation angles about a common optical axis with regard to the first spatial direction.

4. The method of claim 2, wherein each of the polarization rotating elements is independently selected from Kerr-cells and Pockels-cells.

5. The method of claim 1, wherein an additional polarization beam splitter and a passive polarization rotating element are arranged between the microscope objective lens and all the electro-optical deflectors such that the additional polarization beam splitter splits up light emitted out of the sample and passing through the microscope objective lens in two components of two orthogonal polarization directions and such that the passive polarization rotating element rotates the one of the two orthogonal polarization directions of the one component in the other of the two orthogonal polarization directions of the other component so that both components of the fluorescence light are descanned by all the electro-optical deflectors.

6. The method of claim 1, further comprising
arranging a third electro-optical deflector in the beam path of the light beam upstream the microscope objective lens; and
rotating the polarization direction of the light beam by means of the third electro-optical deflector between a fifth polarization direction with which the light beam is deflected by a third polarization beam splitter of the third electro-optical deflector by a fifth angle in the first spatial direction and a sixth polarization direction with which the light beam is deflected by the third polarization beam splitter by a sixth angle in the first spatial direction;
wherein a third angle difference between the fifth and the sixth angles in the first spatial direction is at least 1.5-times the second angle difference between the third and the fourth angles in the first spatial direction.

7. The method of claim 1, further comprising
arranging an analogue acousto- or electro-optical deflector in the beam path of the light beam upstream the microscope objective lens; and
deflecting the light beam by means of the analogue acousto- or electro-optical deflector by a variable angle in the first spatial direction;
wherein an angle range covered by the variable angle in the first spatial direction is equal to the first angle difference between the first and the second angles in the first spatial direction.

8. The method of claim 1, further comprising
arranging a fourth electro-optical deflector in the beam path of the light beam upstream the microscope objective lens;
rotating the polarization direction of the light beam by means of the fourth electro-optical deflector between a seventh polarization direction with which the light beam is deflected by a fourth polarization beam splitter of the fourth electro-optical deflector by a seventh angle in a second spatial direction orthogonal to the first spatial direction and an eighth polarization direction with which the light beam is deflected by the fourth polarization beam splitter by an eighth angle in the second spatial direction;
arranging a fifth electro-optical deflector in the beam path of the light beam upstream the microscope objective lens; and
rotating the polarization direction of the light beam by means of the fifth electro-optical deflector between a ninth polarization direction with which the light beam is deflected by a fifth polarization beam splitter of the fifth electro-optical deflector by a ninth angle in the second spatial direction and a tenth polarization direction with which the light beam is deflected by the fifth polarization beam splitter by a tenth angle in the second spatial direction;
wherein a fifth angle difference between the ninth and the tenth angles in the second spatial direction is at least 1.5-times a fourth angle difference between the seventh and the eighth angles in the second spatial direction.

9. A scanning light microscope comprising
a light source configured to provide a light beam;
a microscope objective lens; and
a scanner arranged between the light source and the microscope objective lens in a beam path of the light beam and configured to scan a sample with the light beam focused by the microscope objective lens, the scanner including a first electro-optical deflector configured to deflect the light beam in a first spatial direction, and a second electro-optical deflector configured to deflect the light beam;

wherein the first electro-optical deflector is a first digital electro-optical deflector configured to deflect the light beam either by a first angle in the first spatial direction or by a second angle in the first spatial direction;

wherein the first electro-optical deflector comprises a first polarization rotating device configured to rotate a polarization direction of the light beam between a first polarization direction and a second polarization direction, and a first polarization beam splitter configured to deflect the light beam with the first polarization direction by the first angle in the first spatial direction and the light beam with the second polarization direction by the second angle in the first spatial direction;

wherein the second electro-optical deflector is a second digital electro-optical deflector configured to deflect the light beam either by a third angle in the first spatial direction or by a fourth angle in the first spatial direction;

wherein the second electro-optical deflector comprises a second polarization rotating device configured to rotate a polarization direction of the light beam between a third polarization direction and a fourth polarization direction, and a second polarization beam splitter configured to deflect the light beam with the third polarization direction by the third angle in the first spatial direction and the light beam with the fourth polarization direction by the fourth angle in the first spatial direction;

wherein a second angle difference between the third and the fourth angles in the first spatial direction is at least 1.5-times a first angle difference between the first and the second angles in the first spatial direction; and wherein the first and second electro-optical deflectors of the scanner are configured to tilt the light beam about a fixed point in a pupil of the microscope objective lens in the first spatial direction.

10. The scanning light microscope of claim 9,
wherein each polarization rotating device comprises at least two polarization rotating elements which are arranged such as to provide for achromatically rotating the respective polarization direction of the light beam upon application of the respective voltage to the respective polarization rotating device, and
wherein each of the polarization beam splitters is an achromatic polarization beam splitter.

11. The scanning light microscope of claim 10, wherein the at least two polarization rotating elements are equal and arranged at different rotation angles about a common optical axis with regard to the first spatial direction.

12. The scanning light microscope of claim 10, wherein each of the polarization rotating elements is independently selected from Kerr-cells and Pockels-cells.

13. The scanning light microscope of claim 9, wherein each of the polarization rotating devices is independently selected from Kerr-cells and Pockels-cells.

14. The scanning light microscope of claim 9, wherein an additional polarization beam splitter and a passive polarization rotating element are arranged between the microscope objective lens and the scanner such that the additional polarization beam splitter is configured to split up light emitted out of the sample and passing through the microscope objective lens in two components of two orthogonal polarization directions and that the passive polarization rotating element rotates the one of the two orthogonal polarization directions of the one component in the other of the two orthogonal polarization directions of the other component so that both components of the fluorescence light are descanned by the scanner.

15. The scanning light microscope claim 9,
wherein the scanner includes a voltage source configured to provide a first and a second voltage;
wherein the first polarization rotating device is configured to rotate the polarization direction of the light beam between the first polarization direction and the second polarization direction by application of the first voltage; and
wherein the second polarization rotating device is configured to rotate the polarization direction of the light beam between the third polarization direction and the fourth polarization direction by application of the second voltage.

16. The scanning light microscope of claim 9, wherein each of the polarization beam splitters is independently selected from Wollaston-prisms and Nomarski-prisms.

17. The scanning light microscope of claim 9,
wherein the scanner includes a third electro-optical deflector;
wherein the third electro-optical deflector is a third digital electro-optical deflector and configured to deflect the light beam either by a fifth angle in the first spatial direction or by a sixth angle in the first spatial direction; and
wherein a third angle difference between the fifth and the sixth angles in the first spatial direction is at least 1.5-times the second angle difference between the third and the fourth angles in the first spatial direction.

18. The scanning light microscope of claim 9,
wherein the scanner includes an analogue optical deflector configured to deflect the light beam by a variable angle in the first spatial direction; and
wherein an angle range covered by the variable angle in the first spatial direction is equal to the first angle difference between the first and the second angles in the first spatial direction.

19. The scanning light microscope of claim 9,
wherein the scanner includes a fourth electro-optical deflector and a fifth electro-optical deflector;
wherein the fourth electro-optical deflector is a fourth digital electro-optical deflector and configured to deflect the light beam either by a seventh angle in a second spatial direction orthogonal to the first spatial direction or by an eighth angle in the second spatial direction;
wherein the fifth electro-optical deflector is a fifth digital electro-optical deflector and configured to deflect the light beam either by a ninth angle in the second spatial direction or by a tenth angle in the second spatial direction; and
wherein a fifth angle difference between the ninth and the tenth angles in the second spatial direction is at least 1.5-times a fourth angle difference between the seventh and the eighth angles in the second spatial direction.

* * * * *